July 3, 1934.  H. M. STOLLER  1,965,439
REGULATED RECTIFIER CIRCUIT
Filed Feb. 3, 1933

INVENTOR
H.M. STOLLER
BY
Wayne B Wells
ATTORNEY

Patented July 3, 1934

1,965,439

UNITED STATES PATENT OFFICE 1,965,439

REGULATED RECTIFIER CIRCUIT

Hugh M. Stoller, Mountain Lakes, N. J., assignor to Bell Telephone Laboratories, Incorporated, New York, N. Y., a corporation of New York Application February 3, 1933, Serial No. 655,063

18 Claims. (Cl. 175—363)

This invention relates to rectifier circuits and particularly to regulated rectifier circuits for supplying rectified current at substantially constant voltage.

One object of the invention is to provide a rectifier circuit between an alternating current supply circuit and a direct current load circuit that shall maintain the load circuit voltage substantially constant.

Another object of the invention is to provide a bridge arrangement between an alternating current supply circuit and a rectifier that shall compensate for variations in the supply circuit voltage.

Another object of the invention is to provide a rectifier circuit having a bridge arrangement formed by the alternating current windings of a saturated inductive reactor and an unsaturated inductive reactor and connected between an alternating current supply circuit and a rectifier that shall vary the degree of saturation of the unsaturated reactor according to the load on the rectifier to maintain the rectified voltage substantially constant irrespective of the load changes on the rectifier.

A further object of the invention is to provide a rectifier circuit having a bridge arrangement compensating for variations in the supply circuit voltage and connecting the alternating current supply circuit to a rectifier that shall govern the bridge arrangement according to the load on the rectifier to maintain the rectified voltage substantially constant irrespective of the load changes on the rectifier.

When a direct current load circuit is supplied with rectified current by a rectifier connected to an alternating current supply circuit without means for regulating the rectified voltage, variations of voltage on the supply circuit or variations in the load on the rectifier will cause variations in the voltage supplied to the load circuit by the rectifier. When a battery is being charged by the output from a rectifier it is desirable to have the rectified current maintained at substantially constant voltage.

In a regulated rectifier circuit constructed in accordance with the invention, provision is made not only to compensate for supply circuit voltage variations but also to compensate for voltage variations caused by load changes. The rectified current from the rectifier is held at substantially constant voltage irrespective of voltage changes on the supply circuit or voltage variations caused by load changes on the rectifier.

In a regulated rectifier circuit constructed in accordance with the invention a rectifier of any suitable type and preferably a tungar or a copper oxide film rectifier is connected between an alternating current supply circuit and a direct current load circuit. The input circuit of the rectifier is connected to the alternating current supply circuit by means of a bridge circuit which compensates for voltage variations on the alternating current supply circuit. Two arms of the bridge circuit comprise two alternating current windings of an unsaturated inductive reactor. The other two arms of the bridge circuit comprise two alternating current windings of a saturated inductive reactor. The unsaturated inductive reactor comprises an iron core having three legs with the two alternating current windings mounted on the outside legs and a direct current winding mounted on the central leg. The saturated inductive reactor comprises an iron core having three legs with two alternating current windings mounted upon the central leg. By a suitable quantitative design of the bridge circuit the voltage output of the bridge which is connected to the input circuit of the rectifier will remain substantially constant irrespective of voltage changes on the alternating current supply circuit.

In order to compensate for voltage changes caused by load changes on the rectifier, the direct current winding of the unsaturated inductive reactor is connected in series with the rectifier output circuit. By varying the energization of the direct current winding of the unsaturated reactor it is possible to vary the impedance of the alternating current windings of such reactor and thus vary the impedance of two arms of the bridge circuit. The impedance of the two arms of the bridge circuit is so varied as to compensate for variations in voltage caused by variations in load on the rectifier.

In case of a simultaneous variation of both the load and the alternating current supply voltage both of the above described effects takes place simultaneously and hold the output voltage of the rectifier substantially constant. The loss caused in the rectifier at different loads may be taken care of by suitable design of the regulating circuit.

In the accompanying drawing, Figure 1 is a diagrammatic view of a regulated rectifier circuit constructed in accordance with the invention;

Figure 1:
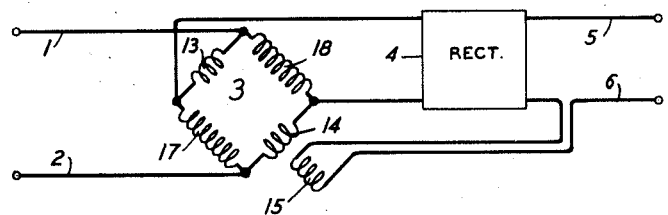

Referring to the regulated rectifier circuit shown in Fig. 1 of the drawing, an alternating current input circuit comprising conductors 1 and 2 is connected by a bridge circuit 3 to the input circuit of a rectifier 4. The rectifier 4 may be of any suitable type and preferably is a tungar rectifier or a copper oxide film rectifier. The output circuit of the rectifier 4 is connected to a direct current load circuit comprising conductors 5 and 6.

Figure 3:
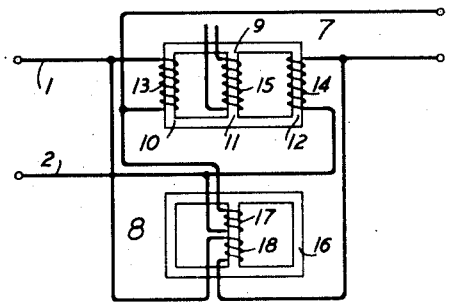
Fig. 3 is a diagrammatic view of the inductive reactors shown in Fig. 1.

The bridge circuit 3 comprises the alternating current windings of two inductive reactors 7 and 8 shown in Fig. 3 of the drawing. The inductive reactor 7 comprises a core member 9 having three legs 10, 11 and 12. Two alternating current windings 13 and 14 are wound on the outside legs 10 and 12 of the core member 9 to assist each other and comprise two arms of the bridge circuit 3. A direct current winding 15 is wound on the central or middle leg 11 of the core member 9 and is connected in series with the output circuit of the rectifier 4 in order to be energized in accordance with the load on the rectifier. The inductive reactor 7 is unsaturated and the degree of saturation is controlled by the direct current winding 15 in a manner to be hereinafter described.

The inductive reactor 8 which is a saturated reactor comprises a core member 16 having three legs with two alternating current windings 17 and 18 mounted on the central or middle leg. The alternating current windings 17 and 18 comprise the other two arms of the bridge circuit 3.

The bridge circuit 3 is designed to compensate for voltage variations on the supply circuit comprising conductors 1 and 2. The alternating current windings of the inductive reactors 7 and 8 are designed so that three quarters of the supply circuit voltage is consumed as the IZ drop across coils 17 and 18 and one quarter of the supply circuit voltage is consumed across the coils 13 and 14. Assuming that the voltage across the supply conductors 1 and 2 increases 10%, the voltage drop across the coil 17, or the coil 18, will increase only a very small amount since the inductive reactor 8 is saturated. The voltage drop across the coils 13 and 14 will increase a much larger amount in proportion to the original drop because the inductive reactor 7 is unsaturated. By suitable quantitative design of the Wheatstone bridge circuit the voltage output from the bridge which is connected to the input circuit of the rectifier 4 will remain substantially constant. In such manner the bridge serves to compensate for variations in voltage across the supply conductors 1 and 2.

Figure 2:
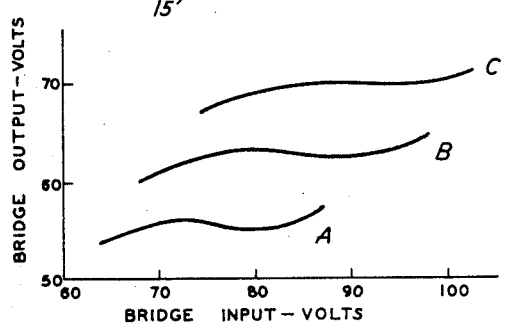
Fig. 2 is a set of curves showing the voltage output from the Wheatstone bridge circuit of Fig. 1.

In Fig. 2 of the drawing are shown curves indicating the voltage output from the bridge circuit at various loads. The abscissa of the curves shown in Fig. 2 are bridge input volts and the ordinates are bridge output volts. Curve A shows the output from the bridge circuit at no load for a variable voltage input, curve B shows the voltage output from the bridge circuit with a two-ampere load and the curve C shows the output voltage from the bridge with a four-ampere load. These curves show that within a limited range the output voltage from the bridge circuit on constant load and variable supply circuit voltage remain constant within plus or minus 1% for a plus or minus 10% variation in the supply circuit voltage. The output voltage from the bridge circuit is higher with increasing load but at any given load will remain substantially constant irrespective of variations in the supply circuit voltage. Compensation for load variations is effected by means of the direct current winding 15 on the unsaturated reactor 7 as will be described below.

The direct current winding 15 on the central leg 11 of the core 9 is in series with the output circuit of the rectifier 4 and varies the degree of saturation of the unsaturated inductive reactor 7 according to the load on the rectifier. If the voltage across the supply conductors 1 and 2 remains constant and the load on the rectifier 4 is increased, then the current flow through the direct current winding 15 of the unsaturated reactor 7 is increased. The increased energization of the coil 15 partially saturates the magnetic circuit of the unsaturated inductive reactor 7 and reduces the impedance of the windings 13 and 14, which are arms of the bridge circuit 3. This reduces the voltage drop in the bridge circuit across the arms comprising coils 13 and 14 and raises the input voltage of the rectifier 4 by an amount sufficient to compensate for the voltage drop caused by the increased load. It is, of course, apparent that in case of a simultaneous variation of both supply circuit voltage and rectifier load that both variations are compensated for simultaneously by the regulator circuits. The bridge circuit takes care of the supply circuit voltage variations and the direct current winding on the unsaturated reactor controls the bridge circuit to compensate for voltage variations caused by variations in load. The direct current winding 15 on the unsaturated reactor is designed to take care of the higher voltage output from the bridge circuit at increasing load and to compensate for the increased IR drop in the rectifier at higher loads.

Figure 4:
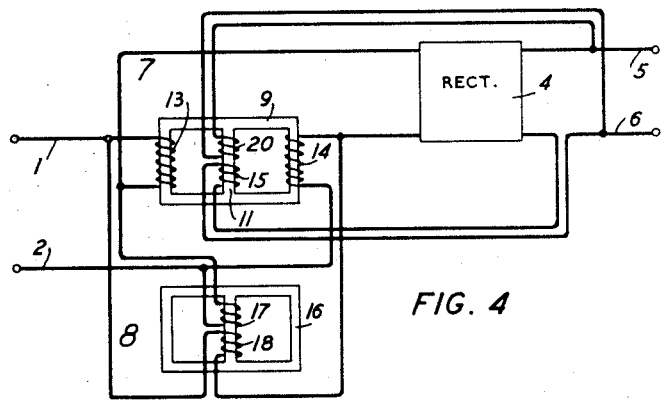
Fig. 4 is a diagrammatic view of a modified regulated rectifier circuit.

Referring to Fig. 4 of the drawing, a regulated rectifier circuit is shown similar to the circuit shown in Figs. 1 and 3 with the exception that an additional shunt connected direct current winding 20 is mounted on the central leg 11 of the core 9 in the unsaturated reactor. In some cases it is found that the desired relation between the applied ampere turns on the middle leg of the unsaturated reactor 7 and the load current output of the rectifier is not a line passing through the origin. In such case it is desirable to provide an additional direct current winding which is energized at a fixed rate to insure that the required amount of initial saturation is provided with zero load current. Inasmuch as the output voltage from the rectifier 4 is substantially constant the winding 20 is shown energized across the rectifier output circuit. The regulated rectifier circuit shown in Fig. 4 operates in exactly the same manner as the above described regulated rectifier shown in Figs. 1 and 3.

Modifications in the circuits and in the arrangement of the location of parts may be made within the spirit and scope of the invention and such modifications are intended to be covered by the appended claims.

What is claimed is:

1. In a regulated rectifier circuit, a rectifier supplying rectified current to a load circuit, and means for connecting said rectifier to an alternating current supply circuit and for compensating the load circuit voltage for variations in the supply circuit voltage and comprising a bridge circuit having four arms.

2. In a voltage-regulated rectifier circuit, a rectifier supplying rectified current to a load circuit, a saturated reactor having two alternating current windings, and an unsaturated reactor having two alternating current windings, a bridge circuit formed with the alternating windings of said reactors, said bridge connecting the rectifier to an alternating current supply circuit and serving to compensate for supply circuit voltage variation.

3. In a regulated rectifier circuit, a bridge circuit having two vertices thereof connected to an alternating current supply circuit, a rectifier having the input circuit thereof connected to the other two vertices of the bridge circuit, and means controlled according to the load on said rectifier for varying the impedance of said bridge circuit.

4. In a regulated rectifier circuit, a bridge circuit having inductive impedance arms, an alternating current supply circuit connected to two vertices of said bridge circuit, a rectifier connected to the other two vertices of the bridge circuit, and means for controlling the impedance of two arms of said bridge circuit according to the load on the rectifier.

5. In a regulated rectifier circuit, a rectifier adapted to be connected to a load circuit and rectifying alternating current received from a supply circuit, a bridge circuit connected between the rectifier and the supply circuit to compensate for variations in the supply circuit voltage, and means for varying the impedance of said bridge circuit according to the load variation to maintain the voltage of the rectified current substantially constant.

6. In a regulated rectifier circuit, a rectifier adapted to supply rectified current to a load circuit, a bridge circuit connecting said rectifier to an alternating current supply circuit and serving to compensate for variations in the supply circuit voltage, and means for varying the impedance of said bridge according to the load on the rectifier to maintain the rectified voltage substantially constant.

7. In a regulated rectifier circuit, a rectifier supplying rectified current to a load circuit, and a bridge circuit comprising inductance arms, two of said inductance arms being mounted on a saturated core and the other two inductance arms being mounted on an unsaturated core, said bridge connecting the rectifier to an alternating current supply circuit and compensating for variations in the supply circuit voltage.

8. In a regulated rectifier circuit, a rectifier supplying rectified current to a load circuit, a bridge circuit comprising inductance arms connected between said rectifier and an alternating current supply circuit, two arms of said bridge circuit being mounted on a saturated core and the other two arms of said bridge circuit being mounted on an unsaturated core, and means controlled from the rectifier load circuit for varying the degree of saturation of the unsaturated core to maintain substantially constant voltage on the load circuit irrespective of load changes.

9. In a regulated rectifier circuit, a rectifier supplying rectified current to a load circuit, a saturated reactor having two alternating current windings, an unsaturated reactor having two alternating current windings and a direct current winding, a bridge circuit formed by the alternating current windings of said reactors and connecting said rectifier to an alternating current supply circuit, said bridge circuit compensating for variations in the supply circuit voltage, and means for energizing the direct current winding of said unsaturated reactor according to the load on said rectifier.

10. In a voltage-regulated rectifier circuit, a rectifier for supplying constant-voltage rectified current to a load circuit, a saturated reactor having two alternating current windings, an unsaturated reactor comprising a core having three legs, two alternating current windings respectfully mounted on the outside legs and a direct current winding mounted on the central leg, a bridge circuit formed with the alternating current windings of said reactors, said bridge connecting the rectifier to an alternating current supply circuit to compensate for supply circuit voltage variations, and means for energizing the direct current winding of said unsaturated reactor according to the load on said rectifier to maintain the rectified voltage constant irrespective of rectifier load variations.

11. In a voltage-regulated rectifier circuit, a rectifier for supplying constant-voltage rectified current to a load circuit, a saturated reactor having two alternating current windings, an unsaturated reactor comprising a core having three legs, two alternating current windings respectfully mounted on the outside legs and two direct current windings mounted on the central leg, a bridge circuit formed with the alternating current windings of said reactors, said bridge connecting the rectifier to an alternating current supply circuit to compensate for supply circuit voltage variations, means for energizing one of the direct current windings of said unsaturated reactor according to the load on said rectifier to maintain the rectified voltage constant irrespective of rectifier load changes, and means for energizing the second direct current winding of the unsaturated reactor at a constant rate to shift the position of the saturation curve of the unsaturated reactor.

12. In a regulated circuit, an alternating current supply circuit, a rectifier for supplying rectified current to a load circuit, a saturated reactor and an unsaturated reactor having two alternating current windings between said rectifier and the alternating current supply circuit, one alternating current winding of said unsaturated reactor being conductively connected to said supply circuit and the other alternating current winding of said unsaturated reactor being conductively connected to said rectifier, and means for varying the degree of saturation of said unsaturated reactor according to the load on said rectifier to maintain the load circuit voltage constant.

13. In a voltage regulator, an alternating current supply circuit, a rectifier for supplying rectified current to a load circuit, a saturated reactor and an unsaturated reactor having two alternating current windings between said rectifier and the alternating current supply circuit, one alternating current winding of said unsaturated reactor being conductively connected to said supply circuit and the other alternating current winding of said unsaturated reactor being conductively connected to said rectifier, and means controlled from the load circuit for varying the degree of saturation of said unsaturated reactor according to an electrical characteristic of the load circuit to maintain the load circuit voltage constant.

14. In a voltage regulator, an alternating current supply circuit, a load circuit, an unsaturated reactor having two alternating current windings and a saturated reactor comprising a connecting circuit between the load circuit and the supply circuit with the two alternating current windings of the unsaturated reactor differently positioned in the connecting circuit between the supply circuit and the load circuit, a direct current winding on said unsaturated reactor, and means for energizing said direct current winding with a direct current varying according to the load on the load circuit.

15. In a voltage regulator, an alternating current supply circuit, a load circuit, an unsaturated reactor having two alternating current windings and a saturated reactor comprising a connecting circuit between the load circuit and the supply circuit with the two alternating current windings of the unsaturated reactor differently positioned in the connecting circuit between the supply circuit and the load circuit, a direct current winding on said unsaturated reactor, and means for energizing said direct current winding with a direct current varying according to an electrical characteristic of the load circuit to maintain the load circuit voltage constant.

16. In a voltage regulator, an alternating current supply circuit, a load circuit, an unsaturated reactor having two alternating current windings and a direct current winding, a saturated reactor having an alternating current winding, the alternating current windings of said reactors comprising a connecting circuit between the load circuit and the supply circuit with the two alternating current windings of the unsaturated reactor differently positioned in the connecting circuit between the supply circuit and the load circuit, and means for energizing said direct current winding with a direct current varying according to an electrical characteristic of the load circuit to vary the degree of saturation of the unsaturated reactor so as to maintain the load circuit voltage constant.

17. In a voltage regulator, an alternating current supply circuit, a rectifier for supplying rectified current to a load circuit and having an input circuit, a saturated reactor having two alternating current windings, an unsaturated reactor having an alternating current winding, the alternating current windings of said reactors being connected between the rectifier and the supply circuit with one alternating current winding of the unsaturated reactor conductively connected to said supply circuit and the other alternating current winding of the unsaturated reactor conductively connected to the input circuit of said rectifier, and means comprising a direct current winding on said unsaturated reactor connected to the load circuit for varying the degree of saturation of said unsaturated reactor according to an electrical characteristic of the load circuit.

18. In a voltage regulator, an alternating current supply circuit, a load circuit, a saturated reactor having two alternating current windings, an unsaturated reactor having an alternating current winding, the alternating current windings of said reactors comprising a connecting circuit between the supply circuit and the load circuit with the two alternating current windings of the unsaturated reactor differently positioned in the connecting circuit between the supply circuit and the load circuit to control the load circuit voltage, and means for supplying a direct current flux to the unsaturated reactor to vary the degree of saturation of said unsaturated reactor and maintain the load circuit voltage constant.

HUGH M. STOLLER.